W. P. BEALL.
POWER JACK FOR MOTOR VEHICLES.
APPLICATION FILED JUNE 27, 1922.

1,436,564.  Patented Nov. 21, 1922.

Inventor,
BY William P. Beall

Patented Nov. 21, 1922.

1,436,564

UNITED STATES PATENT OFFICE.

WILLIAM P. BEALL, OF STEVENSON, MARYLAND.

POWER JACK FOR MOTOR VEHICLES.

Application filed June 27, 1922. Serial No. 571,272.

*To all whom it may concern:*

Be it known that I, WILLIAM P. BEALL, a citizen of the United States, residing at Stevenson, in the county of Baltimore and State of Maryland, have invented new and useful Improvements in Power Jacks for Motor Vehicles, of which the following is a specification.

My invention relates to improvements in power distributing apparatus for use in connection with the rear wheels of an automobile.

An important object of the invention is to provide apparatus of the above mentioned character which is strong, durable, simple in construction and convenient to operate.

A further object of the invention is to provide an improved form of thrust bearing for receiving the power distributing shaft and connected with the frame of the apparatus in a manner whereby the life of the bearing is prolonged.

Other objects and advantages of the invention will be apparent during the course of the following description.

In the accompanying drawings forming a part of this specification and in which like numerals are employed to designate like parts throughout the same.

Figure 1:
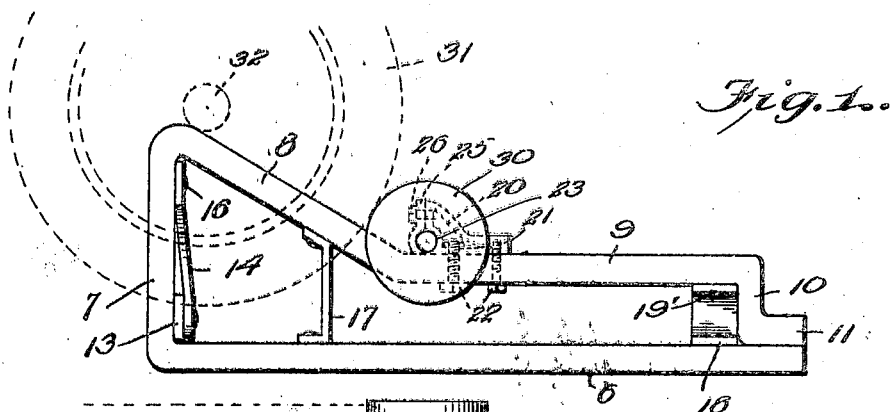
Figure 1 is a side elevation of apparatus embodying my invention.
Figure 2:
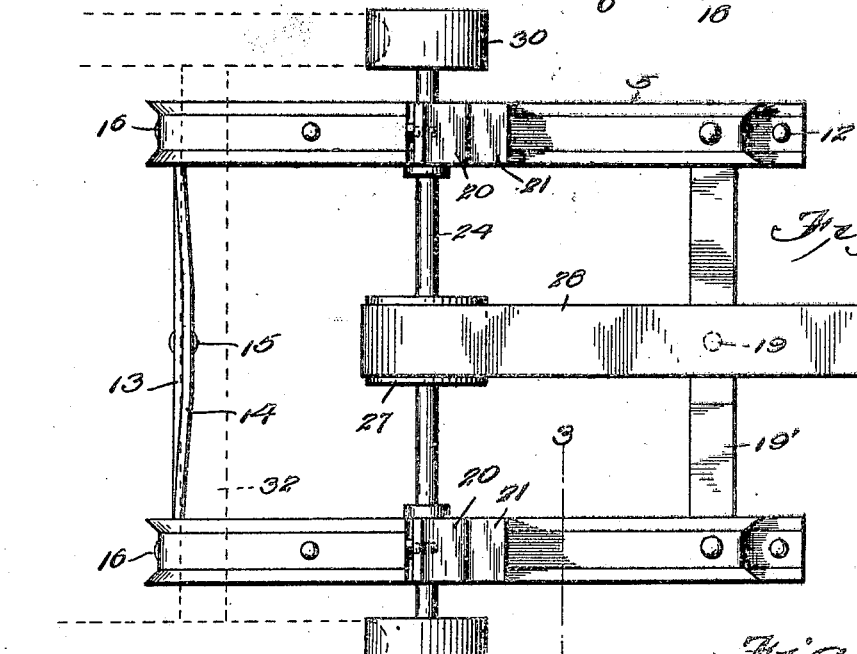
Figure 2 is a plan view of the same.
Figure 4:
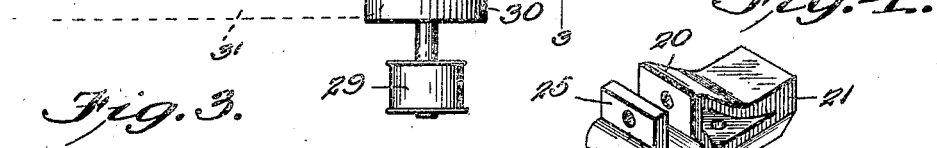
Figure 4 is a perspective view of the thrust bearing.
Figure 4:
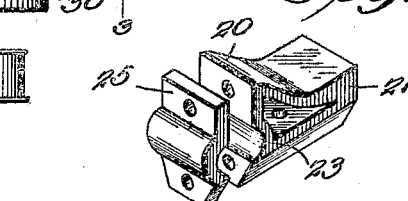

In the drawings, wherein for the purpose of illustration is shown a preferred embodiment of my invention, the numeral, 5 designates side members of a frame. Each side member is preferably formed of a channel iron or bar, having a horizontal lower portion 6, bent upwardly at its forward end to provide a vertical portion 7. At the upper end of this vertical portion the channel bar is bent downwardly and rearwardly, forming a forward upper inclined portion 8, having a rear upper horizontal portion 9 at its lower end. At the rear end of the portion 9 the channel iron is bent at a right angle forming a vertical portion or leg 10, having a horizontal extension or foot 11, which is rigidly secured to the lower horizontal portion 6, as shown at 12.

At the forward end of the frame is disposed a lower horizontal brace 13, rigidly secured to the forward vertical portions 7, and diagonal braces or brace 14 is secured to the horizontal brace 13, between its ends, as shown at 15. The upper ends of the brace or braces 14 are secured to the upper portions of the forward vertical portions 7, as shown at 16. The numeral 17 designates vertical braces interposed between the inclined portions 8 and the horizontal portions 6 and rigidly secured thereto. The rear ends of the horizontal portions 6 are connected by a transverse brace 18, rigidly secured thereto, and a diagonal brace 19' is arranged upon the brace 18 and secured thereto, as shown at 19. The upper ends of this diagonal brace 19' are rigidly secured to the rear ends of the upper horizontal portions 9.

Figure 3:
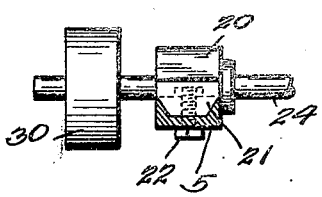
Figure 3 is a transverse section taken on line 3—3 of Figure 2.

Arranged upon the horizontal portions 9 of the side members, near the lower ends of the inclined portions 8, are thrust bearing blocks or elements 20, having bases 21, which are tapered in transverse section, to fit snugly within the recesses of the channel bars, as clearly shown in Figure 3.

The bases 21 are rigidly secured to the upper portions 9 by bolts 22, and the bearing blocks 20 have transverse recesses or openings 23, rotatably receiving a transverse power distributing shaft 24. Plates 25 are arranged forwardly of this shaft 24, to hold the same against displacement, and these plates are secured to the blocks by bolts 26.

A power distributing pulley 27 is rigidly secured to the shaft 24 near its center, and this pulley is adapted to be engaged by a belt 28, as shown. A second pulley 29 may be secured to either end of the shaft 24, to rotate therewith, and these pulleys may be secured to both ends of the shaft, or at any other suitable point thereon if desired.

Rigidly secured to the end portions of the shaft 24 are drive pulleys or wheels 30, adapted to contact with the rear wheels 31 of the automobile, carried by the rear axle 32.

In the use of the apparatus, the frame is inclined and the forward end thereof inserted beneath the rear axle 32, in contact therewith. When the rear end of the frame is moved downwardly, the forward end thereof elevates the axle 32 and raises the wheels 31 out of contact with the ground, the axle 32 now contacting with the inclined portions 8, and sliding down the same until the wheels 31 frictionally engage the pulleys or wheels 30, to drive them. Particular attention is called to the fact that the bearing elements or blocks 20 are not carried by the inclined portions 8, but are secured to the horizontal portions 9, near the rear ends of such inclined portions. By the peculiar shape, arrangement, and mounting of the thrust bearing blocks, it has been found that they are adapted to effectually withstand the severe strains and wear, inherent in such a machine, whereby their life is greatly prolonged.

It is to be understood that the form of my invention herewith shown and described is to be taken as a preferred example of the same and that various changes in the shape, size, and arrangement of parts, may be resorted to, without departing from the spirit of my invention or the scope of the subjoined claim.

Having thus described my invention, what I claim is:

In apparatus of the kind described, a frame including spaced side members each constructed of a single length of bar metal of channel iron cross section with the flanges outwardly disposed, said bar metal being formed to provide a horizontal base portion, bent vertically upward to provide a front end portion, bent downward from the top of the end portion at an acute angle to said end portion, bent at an obtuse angle to the last portion to lie horizontally and parallel to the base, bent downward and then rearward to provide a rear end portion and foot, the latter resting on the rear end of the base portion and secured thereto, in combination with a pair of bearings each having a base wedge shaped to fit tightly in the respective channel section, said bearings being located on the upper portion close to the inclined portion and bolted to said horizontal portion whereby to decrease the shearing stresses on the bolts.

WILLIAM P. BEALL.